(12) United States Patent
Beppu et al.

(10) Patent No.: US 8,223,265 B2
(45) Date of Patent: Jul. 17, 2012

(54) HORIZONTAL AND VERTICAL SYNCHRONIZATION SIGNAL GENERATING CIRCUIT

(75) Inventors: Takemi Beppu, Ohizumi-machi (JP); Naoyuki Konno, Sapporo (JP)

(73) Assignee: Sanyo Electric Co., Ltd., Osaka (JP)

( * ) Notice: Subject to any disclaimer, the term of this patent is extended or adjusted under 35 U.S.C. 154(b) by 1293 days.

(21) Appl. No.: 11/698,754

(22) Filed: Jan. 26, 2007

(65) Prior Publication Data

US 2007/0177057 A1    Aug. 2, 2007

(30) Foreign Application Priority Data

Jan. 30, 2006  (JP) .................................. 2006-20391

(51) Int. Cl.
H04N 5/06 (2006.01)
H04N 5/04 (2006.01)
H03L 7/00 (2006.01)

(52) U.S. Cl. .................... 348/521; 348/500; 348/548
(58) Field of Classification Search .................... None
See application file for complete search history.

(56) References Cited

U.S. PATENT DOCUMENTS

2002/0036708 A1 * 3/2002 Horita ......................... 348/521

FOREIGN PATENT DOCUMENTS

| CN | 1266331 | 9/2000 |
|---|---|---|
| JP | 8149332 A | 6/1996 |
| JP | 9-154082 | 6/1997 |
| JP | 11004359 A | 1/1999 |

OTHER PUBLICATIONS

Chinese Office Action for Chinese Application No. 200710087919.9, mailed on Jul. 4, 2008 (7 pages).
esp@cenet patent abstract for Chinese Publication No. 1266331, Publication date Sep. 13, 2000 (1 page).
English Patent Abstract of JP9154082 from esp@cenet database (1 page).
Japanese Office Action for Application No. 2006-020391, Mailed on Mar. 8, 2011 (4 Pages With English Translation).
esp@cenet Patent Abstract for Japanese Publication No. 8-149332, publication date Jun. 7, 1996. (1 page).
esp@cenet Patent Abstract for Japanese Publication No. 11-004359, publication date Jan. 6, 1999. (1 page).

* cited by examiner

*Primary Examiner* — Jefferey Harold
*Assistant Examiner* — Sean Haiem
(74) *Attorney, Agent, or Firm* — Osha Liang LLP

(57) ABSTRACT

Timing of internally generated horizontal synchronization signal and vertical synchronization signal is shifted. An internal clock is synchronized with a horizontal synchronization signal separated in a synchronization separation circuit 10, an H reset signal is generated based thereon in an H countdown circuit 14, and a horizontal synchronization signal is generated based thereon. A vertical synchronization signal separated in the synchronization separation circuit 10 is normalized by a 2×FH signal obtained in the H countdown circuit 14, and based on an obtained V reset signal, a vertical synchronization signal is obtained in a VS output circuit 18. Here, the VS output circuit 18 internally has a delay circuit, and the timing of a vertical synchronization signal VS to be output is shifted from that of a horizontal synchronization signal HS.

3 Claims, 4 Drawing Sheets

HORIZONTAL AND VERTICAL SYNCHRONIZATION SIGNAL GENERATING CIRCUIT

PRIORITY INFORMATION

This application claims priority to Japanese Patent Application No. 2006-020391 filed on Jan. 30, 2006, which is incorporated herein by reference in its entirety.

BACKGROUND OF THE INVENTION

1. Field of the Invention

The present invention relates to a circuit for generating horizontal and vertical synchronization signals for internal use based on horizontal and vertical synchronization signals included in a television signal (TV signal).

2. Description of the Related Art

In a device for reproducing a TV signal, such as a television receiver, a video player, or the like, reliable synchronization is achieved by separating horizontal and vertical synchronization signals from an externally supplied TV signal, internally generating horizontal and vertical synchronization signals synchronized with the obtained horizontal and vertical synchronization signals, and using these internally generated horizontal and vertical synchronization signals.

FIG. 4 shows a structure of a related art synchronization signal generating circuit. An external TV signal is supplied to a synchronization separation circuit 10, in which a horizontal synchronization signal HSYNC and a vertical synchronization signal VSYNC are separated from the TV signal. The horizontal synchronization signal HSYNC is supplied to a VCO/AFC circuit 12. This VCO/AFC circuit internally has a PLL (phase-locked loop) circuit, and generates a 4 MHz internal clock synchronized with the supplied horizontal synchronization signal HSYNC. This internal clock is then supplied to an H countdown circuit 14. The H countdown circuit 14 counts clocks of the internal clock, and generates a horizontal synchronization signal HS for internal use.

Here, a signal having a period of a half of one horizontal period is necessary in a vertical retrace period, and the H countdown circuit 14 generates a 2×FH signal which is a signal having a frequency of twice that of one horizontal period. Then, this 2×FH signal is supplied to a V countdown circuit 16. The vertical synchronization signal VSYNC separated in the synchronization separation circuit 10 is also supplied to this V countdown circuit 16, the timing of this vertical synchronization signal VSYNC (for example, a fall time of the vertical synchronization signal VSYNC which has "H" level normally) is synchronized with the 2×FH signal, and a normalized vertical synchronization signal VS is obtained.

The horizontal synchronization signal HS and the vertical synchronization signal VS thus obtained are used to control the display timing of a display.

A process for synchronization signals for video signals is described in, for example, Japanese Patent Laid-Open Publication No. Hei 09-154082.

Here, the horizontal and vertical synchronization signals HS and VS generated in the manner described above are perfectly synchronized, as in the original TV signal.

However, in a video signal processing circuit, when the timing of these signals is shifted to some extent, vertical jitter on an OSD (on-screen display) may occur due to change in number of horizontal counts within a vertical period in a next-stage circuit or the like, depending on whether HS comes before or after VS.

SUMMARY OF THE INVENTION

According to one aspect of the present invention, a delay circuit delays an internal vertical synchronization signal, and there by the timing of an internal horizontal synchronization signal and an internal vertical synchronization signal can be shifted by a predetermined short period of time. As a result, a stable number of horizontal counts within a vertical period is obtained in a next-stage circuit or the like.

BRIEF DESCRIPTION OF THE DRAWINGS

An embodiment of the present invention will be described in detail with reference to the following drawings, wherein.

DESCRIPTION OF PREFERRED EMBODIMENT

An embodiment of the present invention will be described below with reference to the drawings.

Figure 1:
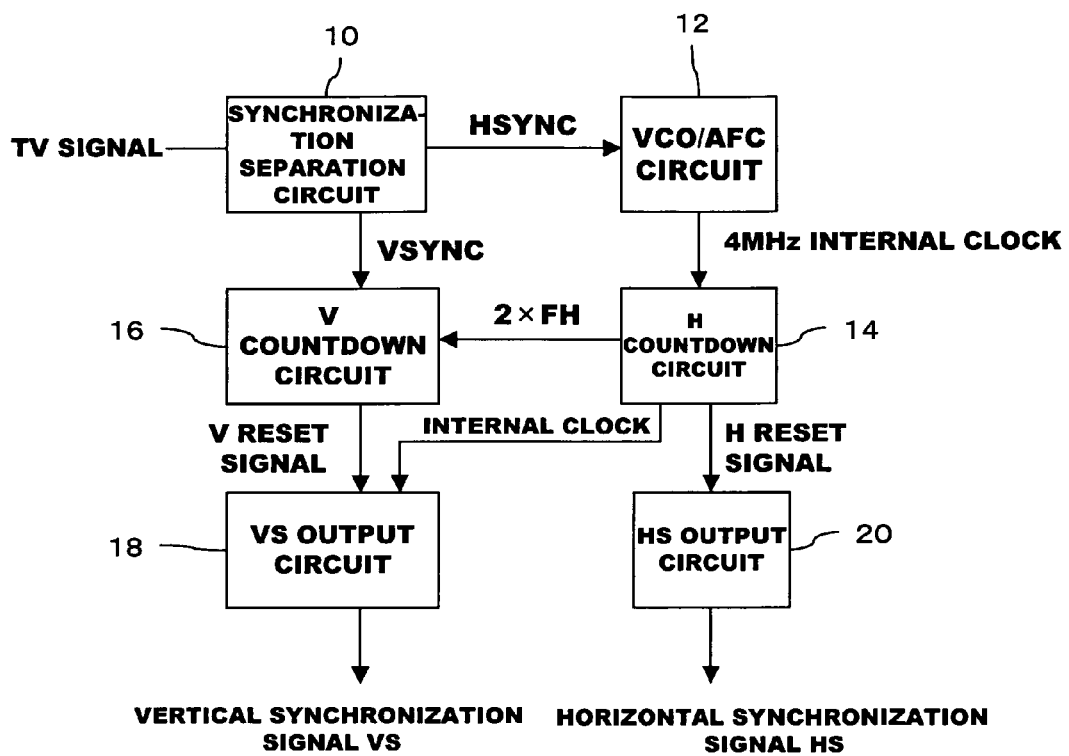
FIG. 1 shows a structure of an embodiment of the present invention.

FIG. 1 shows an overall structure of the embodiment. As in the related art example, an external TV signal is supplied to a synchronization separation circuit 10, in which a horizontal synchronization signal HSYNC and a vertical synchronization signal VSYNC are separated from the TV signal. The horizontal synchronization signal HSYNC is supplied to a VCO/AFC circuit 12, in which a 4 MHz internal clock synchronized with the horizontal synchronization signal HSYNC is generated. This internal clock is then supplied to an H countdown circuit 14. The H countdown circuit 14 counts clocks of the internal clock, and generates an H reset signal which is a pulse indicating one horizontal period. In other words, the number of clocks of the internal clock corresponding to one horizontal period is constant, the level changes to "L" level every time the count reaches a predetermined number, and an H reset signal which is at "L" level for a preset period of time is generated. It should be noted that it is necessary for a count start time to be synchronized with the horizontal synchronization signal HSYNC, and this time is confirmed as appropriate. The H reset signal is supplied to an HS output circuit 20, and this HS output circuit 20 generates a horizontal synchronization signal HS for internal use based on the H reset signal. In other words, the HS output circuit 20 has a pulse width adjusting circuit, and generates a horizontal synchronization signal HS which is at "L" level for a set period of time (an appropriate period of time according to a predetermined horizontal retrace period) based on the H reset signal indicating one horizontal period. It should be noted that a video signal obtained at the synchronization separation circuit 10 is displayed on a display at the timing of the internally generated horizontal and vertical synchronization signals.

Further, as described above, a signal having a period of a half of one horizontal period is necessary in a vertical retrace period, and the H countdown circuit 14 generates a 2×FH signal which is a signal having a frequency of twice that of one horizontal period.

Here, although the horizontal synchronization signal HS is an internal horizontal synchronization signal for use in an internal circuit, the H reset signal and the 2×FH signal also indicate timing of horizontal synchronization, and in the present application, are included in the internal horizontal synchronization signal.

Then, this 2×FH signal is supplied to a V countdown circuit 16. The vertical synchronization signal VSYNC separated in the synchronization separation circuit 10 is also supplied to this V countdown circuit 16, the timing of this vertical synchronization signal VSYNC (for example, a fall time of the vertical synchronization signal VSYNC which has "H" level in normal times) is synchronized with the 2×FH signal, and a normalized V reset signal is obtained. This reset signal is a signal in which a fall time of the vertical synchronization signal VSYNC is synchronized with the 2×FH signal, and an "L" level period is set to a predetermined period of time.

The V reset signal thus obtained is supplied to a VS output circuit 18. This VS output circuit 18 provides a predetermined delay to the V reset signal, sets an "L" level period to a preset period of time, and generates and outputs a vertical synchronization signal VS.

It should be noted that although the vertical synchronization signal VS is an internal vertical synchronization signal, the V reset signal is also a signal indicating timing of vertical synchronization, and in the present application, is included in the internal vertical synchronization signal.

Figure 2:
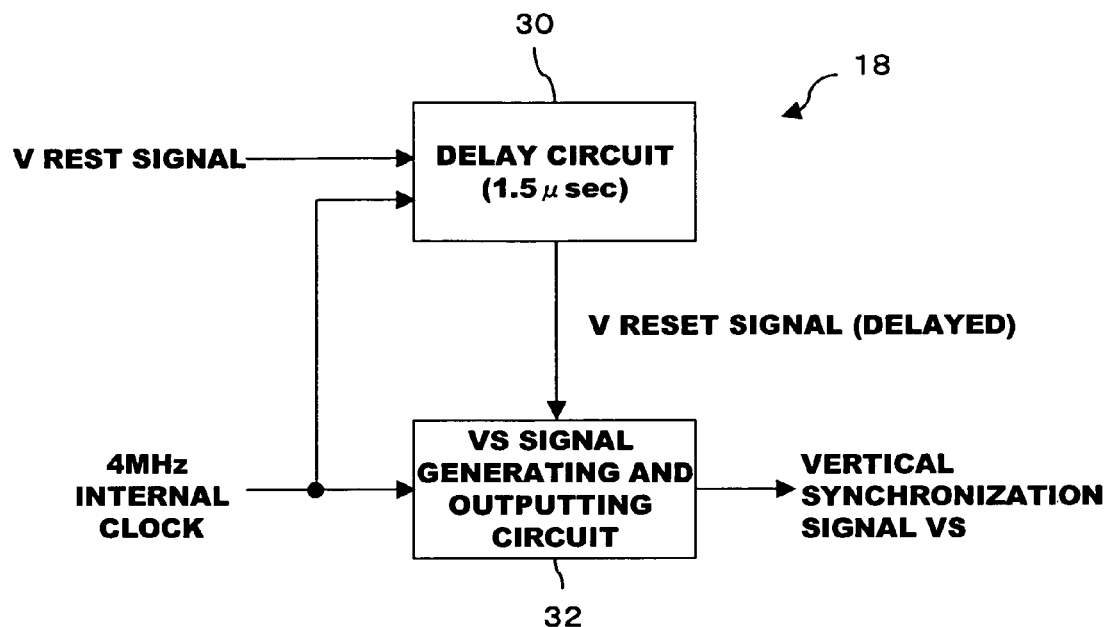
FIG. 2 shows a structure of a VS output circuit.

Here, a structure of the VS output circuit 18 is shown in FIG. 2. The V reset signal is input to a delay circuit 30. A 4 MHz internal clock is also supplied to this delay circuit 30, and this 4 MHz internal clock is used to delay the V reset signal by a predetermined short period of time. For example, causing a delay of 6 clocks of the internal clock will result in a delay of 1.5 μsec. It should be noted that serially connected flip-flops are suitable for such delay.

The V reset signal delayed at the delay circuit 30 is supplied to a VS signal generating and outputting circuit 32. A 4 MHz internal clock is also supplied to this VS signal generating and outputting circuit 32, and by counting clocks of this internal clock, an "L" level period for the V reset signal is set to a predetermined period of time, and a resultant signal is output as the vertical synchronization signal VS. Here, the vertical synchronization signal VS is a signal whose "L" level period is set to be an appropriate period of time according to a predetermined vertical retrace period.

Figure 3:
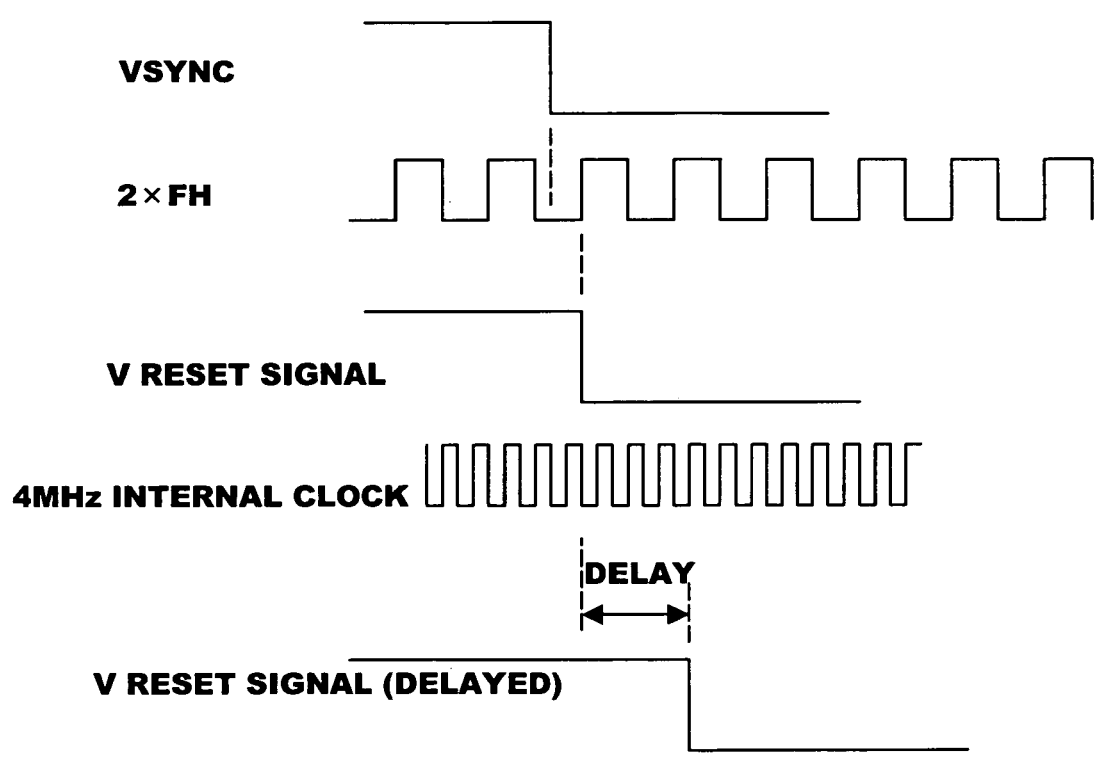
FIG. 3 shows waveforms of various types of signals.
Figure 4:
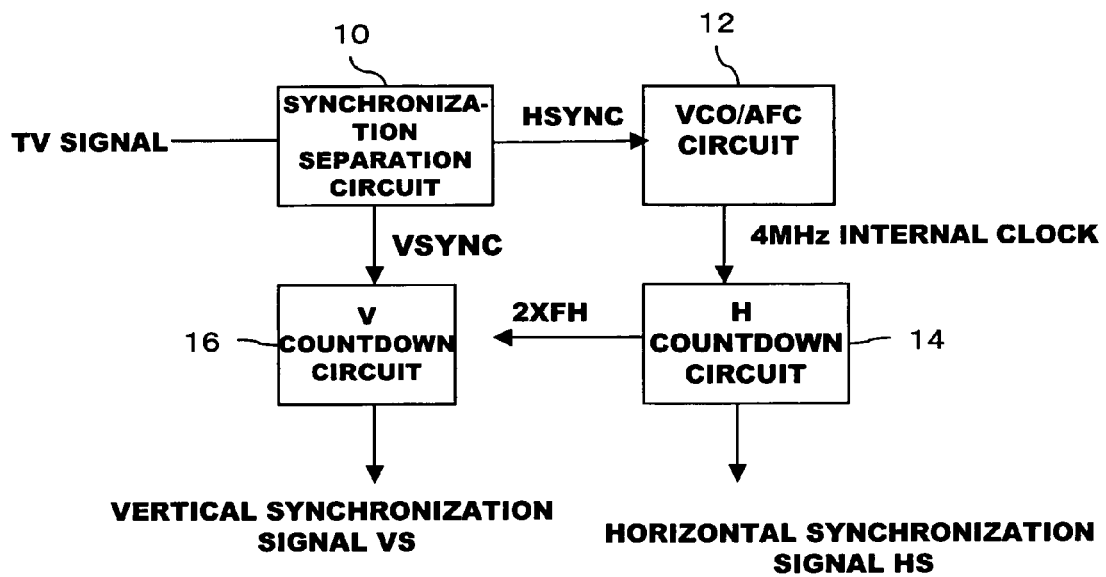
FIG. 4 shows a structure of a related art example.

Here, FIG. 3 schematically shows signal waveforms in the V countdown circuit 16 and the delay circuit 30 of the VS output circuit 18.

As shown, in the V countdown circuit 16, a fall of the vertical synchronization signal VSYNC is synchronized with a rise of the 2×FH signal, and the V reset signal is obtained. Then, in the delay circuit 30, a fall of the V reset signal is delayed by a predetermined number of clocks of the 4 MHz internal clock.

The horizontal and vertical synchronization signals HS and VS thus obtained are used in various types of processing in a next-stage video signal processing IC, and are used to control the display timing of a display.

As described above, in the present embodiment, a fall time of the vertical synchronization signal (vertical reset signal), which determines a start of one vertical period, is delayed by a predetermined short period of time with respect to a fall time of the horizontal synchronization signal (horizontal reset signal), which determines a start of one horizontal period. Therefore, even if a fall time of the horizontal synchronization signal HS is shifted forward or backward to some extent with respect to a fall time of the vertical synchronization signal, the fact that a fall of the vertical synchronization signal exists after a fall of the horizontal synchronization signal remains unchanged. Therefore, the number of falls of the horizontal synchronization signal after the vertical synchronization signal has fallen can be stably counted.

It should be noted that for the above-described various types of signals, the rise and fall times are important, and there is no problem even if the "L" level and the "H" level are inverted.

What is claimed is:

1. A horizontal and vertical synchronization signal generating circuit for generating a horizontal synchronization signal and a vertical synchronization signal, the circuit comprising:
    a synchronization separation circuit for separating the horizontal synchronization signal and the vertical synchronization signal from a television signal;
    a horizontal synchronization signal generating circuit for synchronizing an internal clock with the horizontal synchronization signal, separated in the synchronization separation circuit, to generate an internal horizontal synchronization signal based on the internal clock;
    a normalizing circuit for normalizing timing of the vertical synchronization signal, separated in the synchronization separation circuit, to generate a normalized internal vertical synchronization signal based on the internal horizontal synchronization signal based on the internal clock,
        wherein times of state change of the normalized internal vertical synchronized signal are synchronized with times of state change of the internal horizontal synchronization signal; and
    a delay circuit for delaying, by a predetermined period of time, the normalized internal vertical synchronization signal to generate an internal vertical synchronization signal,
    wherein timing of the generated internal vertical synchronization signal against timing of the generated internal horizontal synchronization signal is shifted by the predetermined period of time, wherein the times of state change of the internal vertical synchronization signal are shifted from the times of state change of the internal horizontal synchronization signal,
    wherein times of state change of the internal vertical synchronization signal are different from times of state change of the internal horizontal synchronization signal by shifting the internal vertical synchronization from the normalized internal vertical synchronization signal whose times of state change are synchronized with those of the internal horizontal synchronization signal.

2. The circuit according to claim 1, wherein the delay circuit determines a delay time by counting a predetermined number of clocks of the internal clock.

3. The circuit according to claim 1, wherein the delay circuit delays the internal vertical synchronization signal by about 1.5 μsec.

* * * * *